United States Patent [19]
Morello et al.

[11] 3,909,595
[45] Sept. 30, 1975

[54] ENTRY GATE CONSTRUCTION FOR CREDIT CARD ACTUATED AUTOMATIC REMOTE BANKING EQUIPMENT

[75] Inventors: Herbert Morello, North Canton; George S. Mountford, Chippewa Lake Village, both of Ohio

[73] Assignee: Diebold, Incorporated, Canton, Ohio

[22] Filed: Aug. 8, 1974

[21] Appl. No.: 495,581

[52] U.S. Cl. .................. 235/61.11 R; 235/61.7 B; 235/61.11 D
[51] Int. Cl. ...... G06k 7/01; G06k 5/00; G06k 7/08
[58] Field of Search .............. 235/61.11 R, 61.11 A, 61.11 B, 235/61.11 C, 61.11 D, 61.7 B; 340/149 A; 250/555, 566

[56] References Cited
UNITED STATES PATENTS

| | | | |
|---|---|---|---|
| 3,626,159 | 12/1971 | Chumley | 235/61.11 R |
| 3,627,994 | 12/1971 | Sallach et al. | 235/61.7 B |
| 3,634,656 | 1/1972 | Krechmer | 235/61.7 B |
| 3,712,973 | 1/1973 | Karl | 235/61.11 R |
| 3,777,120 | 12/1973 | Menger et al. | 235/61.11 R |
| 3,792,237 | 2/1974 | Olson | 235/61.11 R |

Primary Examiner—Daryl W. Cook
Attorney, Agent, or Firm—Frease & Bishop

[57] ABSTRACT

The construction of a gate for entering a coded embossed personalized conventional magnetic stripe credit card into remote automatic banking equipment for verification of the card, identification of the card holder, authorization of the use of the card and actuation of the banking equipment for the desired banking transaction. The entry gate construction verifies the width and thickness of a genuine card and requires card orientation with the proper card surface up and the proper card end initially entered so that a subsequent card reading operation may properly be carried out to verify the validity of the card, its presentation by a properly identified person, and authorization of its use for the desired banking service; all with respect to use of known credit card structures satisfying specification requirements for many uses and which cards have embossed indicia and magnetic stripe means thereon. The entry gate has a slot through which the card is entered. The slot has a special shape in cross section which with related card blocking means insures that only a valid or genuine card may be entered through the slot and moved to an adjacent card reader with the card properly oriented for processing in the card reader.

9 Claims, 15 Drawing Figures

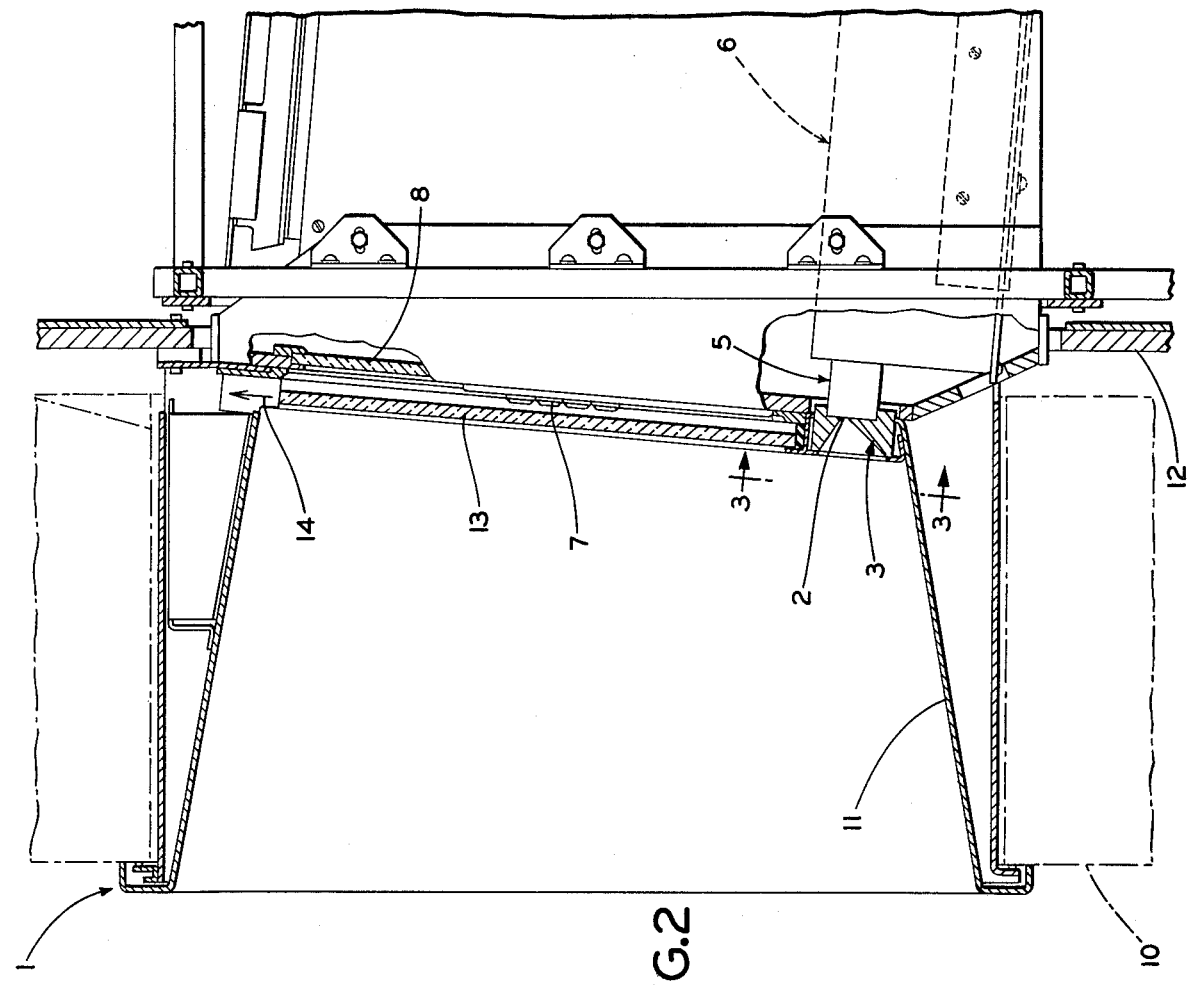
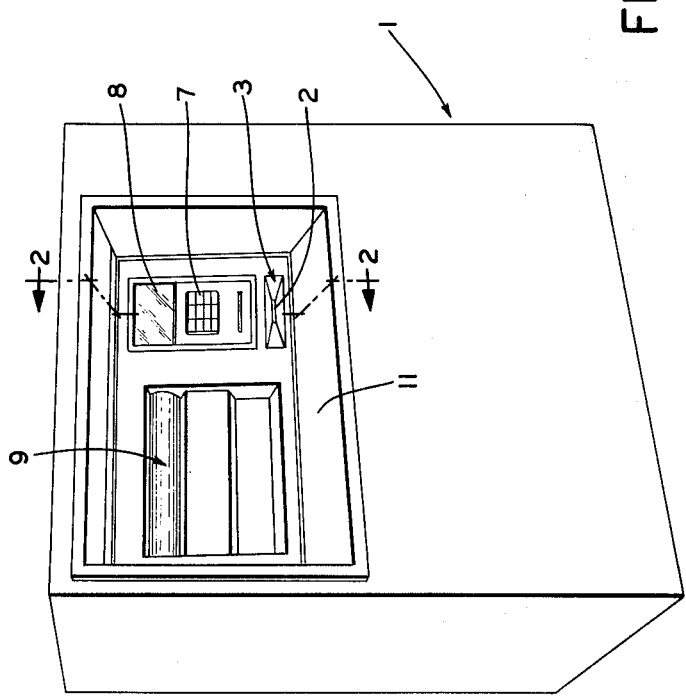
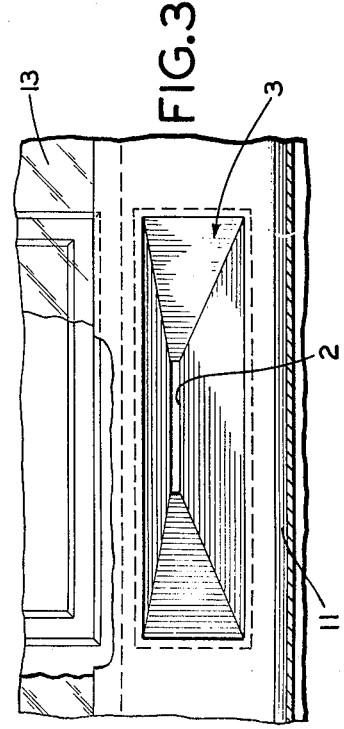

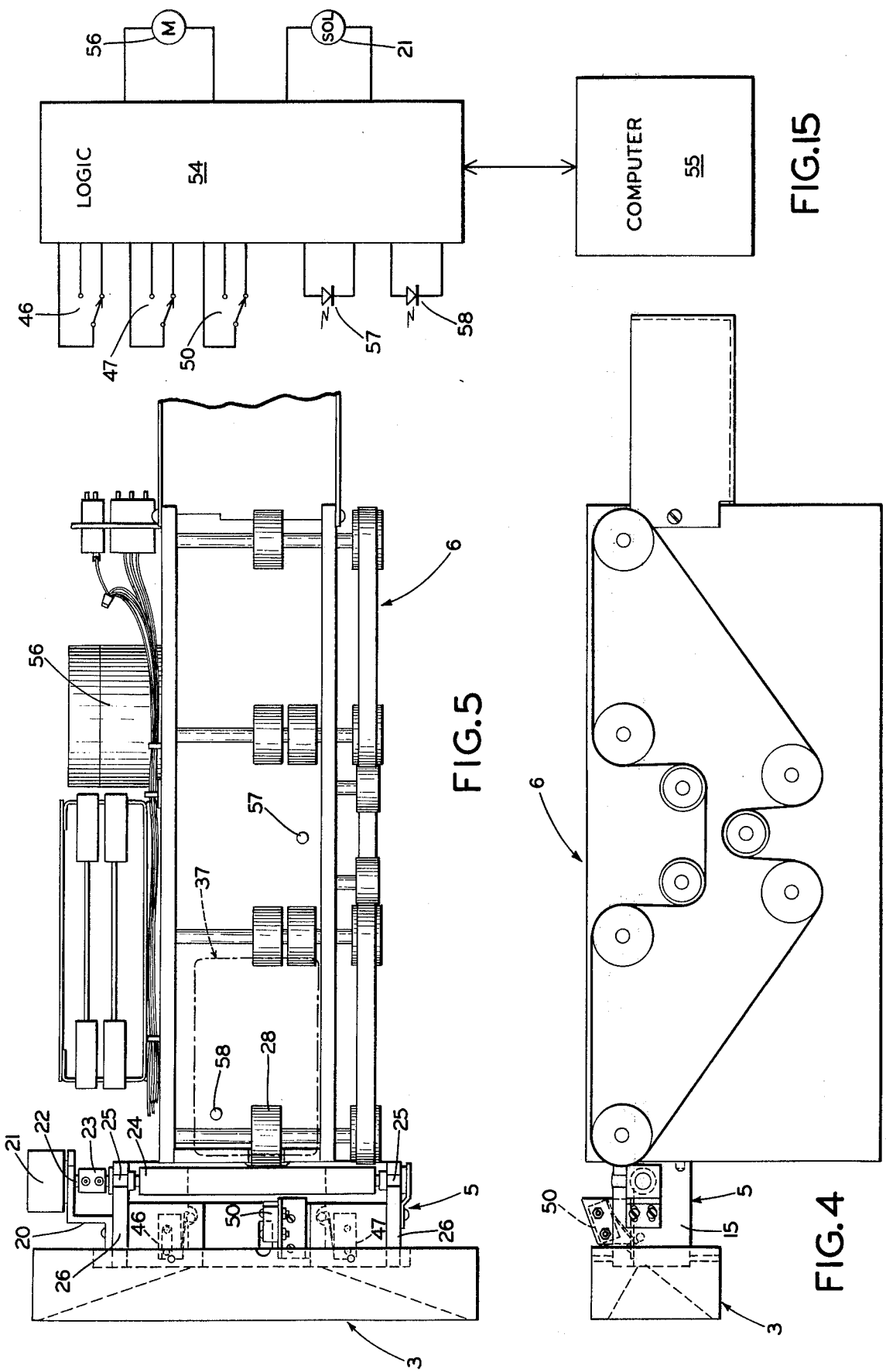

ENTRY GATE CONSTRUCTION FOR CREDIT CARD ACTUATED AUTOMATIC REMOTE BANKING EQUIPMENT

BACKGROUND OF THE INVENTION

1. Field of the Invention

The invention relates to total automatic banking system equipment actuated by a coded credit card-type card after card verification; and more particularly to an entry gate construction through which a card is entered into the equipment for verification and subsequent actuation of the equipment so that the desired banking transaction may be carried out, such as accepting deposits, dispensing cash, transferring funds between accounts, or making credit card, utility, mortgage or installment loan payments and the like.

Also, the invention relates to banking equipment credit card entry gate construction which provides maximum security control to prevent use of unauthorized or invalid cards for actuating the banking equipment, and to insure the proper presentation and entry of a personalized conventional embossed magnetic plastic card into the banking equipment for verification and subsequent actuation of the components of the equipment that are used to carry out the desired banking transaction.

2. Description of the Prior Art

Prior automatic banking equipment and other credit card-actuated devices have used a variety of means for entering the actuating card into the equipment or delivering the card to a card reader. One prior device requires the special provision of coded black areas specially embedded in the card, which black areas are optically scanned to determine properly located and registered areas to enable the scanning equipment to open an up and down movable gate to permit card insertion. This arrangement is not desirable because it requires the manufacture of a special credit card having the black area coding thereon, and requires the use of special optical scanning equipment in addition to the card reader means through which the card is subsequently processed.

Other prior credit card entry devices merely guide an embossed card in a properly oriented manner to an adjacent component where the card is subsequently processed, without checking the genuineness of the card as to thickness and width so as to prevent an otherwise spurious card from being entered through the entry gate.

Another prior card entry device, while prohibiting improperly sized credit cards and miscellaneous debris from being inserted into the equipment, does not accommodate a coded embossed magnetic stripe card in such manner as to insure insertion of such a card in only one way into the equipment, while at the same time protecting card embossment and magnetic stripe means thereon against rubbing or wear during card insertion.

Still another prior card entry device actuates an entry slot blocking member blocking the entry slot by the magnetic stripe on the card, magnetic sensors responsive to magnetic flux generated by card movement, amplifiers, resistors, capacitors, and other electronic components to move the blocking member to open the entry slot. Such components substantially complicate the construction and maintenance of the equipment.

Thus, there exists a need for an entry gate construction for credit card actuated automatic banking equipment which is simplified in construction and operation, and which is controlled through special geometry of the entry slot and related simple and reliable electrical components for the acceptance of a valid or genuine credit card oriented for entry in only one way, which card has both embossed characters and a magnetic stripe thereon that are protected against wear or damage in passing through the entry gate structure.

SUMMARY OF THE INVENTION

Objectives of the invention include providing an entry gate construction for credit card actuated automatic remote banking equipment which will accept a credit card conforming to ANSI (American National Standards Institute) specifications having embossed indicia and magnetic stripe means in only one properly oriented manner while at the same time determining the genuineness of the card as to width and thickness, for delivery to a card reader mechanism; providing such a credit card entry gate construction that is simple and uncomplicated in design, utilizing a special cross-sectional geometry of a slot through which the card passes, cooperatively combined with simple reliable microswitches and a related solenoid to unblock the slot when a genuine card is presented, while requiring the card to be entered in only one way and at the same time protecting the embossment and magnetic stripe on the card from damage or wear during its passage through the slot; providing such an entry gate construction in which the relief of the slot to provide clearance preventing wear on the card embossment and magnetic stripe does not permit flexing of the card to such a degree that a spurious card can be entered through the gate or that the card can be improperly oriented during entry; providing such an entry gate construction in which the various objectives are accomplished through a simple geometric design of the slot through which the card is entered cooperatively arranged with respect to simple card thickness and width sensing devices; providing a new entry gate construction for credit card-actuated automatic remote banking equipment which eliminates difficulties and special complicated equipment involved in the use of prior entry gate structures; and providing a new entry gate construction for credit card actuated automatic remote banking equipment which achieves the stated objectives in a simple, effective and uncomplicated manner, and which solves problems and satisfies needs existing in the field of coded personalized conventional embossed magnetic plastic credit card actuated banking equipment.

These and other objects and advantages may be obtained by the new entry gate construction for credit card actuated automatic remote banking equipment and the like, the general nature of which may be stated as including gate housing means forming a preferably horizontally-extending entry slot open at one end for the entry of a card; tumbler gate means movably mounted on the housing means normally in a position blocking the other end of the entry slot and having slot means therein adapted to be aligned with said entry slot upon movement of said tumbler means out of blocking position; said entry slot having upper and lower surfaces extending longitudinally between the open and normally blocked slot ends spaced apart at its edges and at intervening spaced intervals a distance equal substantially to the specified thickness of a genuine plastic credit card, said slot having a lateral width equal substantially to the specified width of a normal credit card, and the upper and lower slot suface, portions at said slot edges forming restricted slot edge zones; one of the upper and lower entry slot surfaces being recessed at two laterally separated intervals a greater distance than the thickness of the credit card to be entered plus the amount of embossment projection; the other of the upper and lower entry slot surfaces being recessed to provide substantial clearance in a longitudinally extending slot passage located adjacent one of the restricted slot edge zones; microswitch means mounted on the gate housing having switch blade actuator means extending into the spaced restricted slot edge zones, other microswitch means mounted on the gate housing having switch blade actuator means extending into and restricted slot edge zones; solenoid means for moving said tumbler gate means; and circuitry including a power source operatively connected with said solenoid means and said switch means to energize the solenoid means when all of such switch means are closed to move the tumbler means from blocking to unblocking position.

BRIEF DESCRIPTION OF THE DRAWINGS

A preferred embodiment of the invention — illustrative of the best mode in which applications have contemplated applying the principles — is set forth in the following description and shown in the drawings and is particularly and distinctly pointed out and set forth in the appended claims.

FIG. 1 is a diagrammatic perspective view of an automatic remote banking unit having a currency dispensing mechanism equipped with the new entry gate construction;

FIG. 2 is an enlarged fragmentary diagrammatic vertical sectional view, with parts broken away, taken on the line 2—2, FIG. 1, illustrating the manner in which an assembly of the entry gate and related components is mounted within the banking unit housing;

FIG. 3 is a fragmentary view looking in the direction of the arrows 3—3, FIG. 2 showing the entry funnel used to direct a credit card into the entry gate;

FIG. 4 is a diagrammatic side elevation of the entry funnel, entry gate and card reader components assembled together but removed from the banking unit housing;

FIG. 5 is a top plan partially diagrammatic view of the assembly shown in FIG. 4;

FIG. 15 is a schematic wiring diagram for the entry gate.

Similar numerals refer to similar parts throughout the various figures of the drawings.

DESCRIPTION OF THE PREFERRED EMBODIMENT

Figure 7:
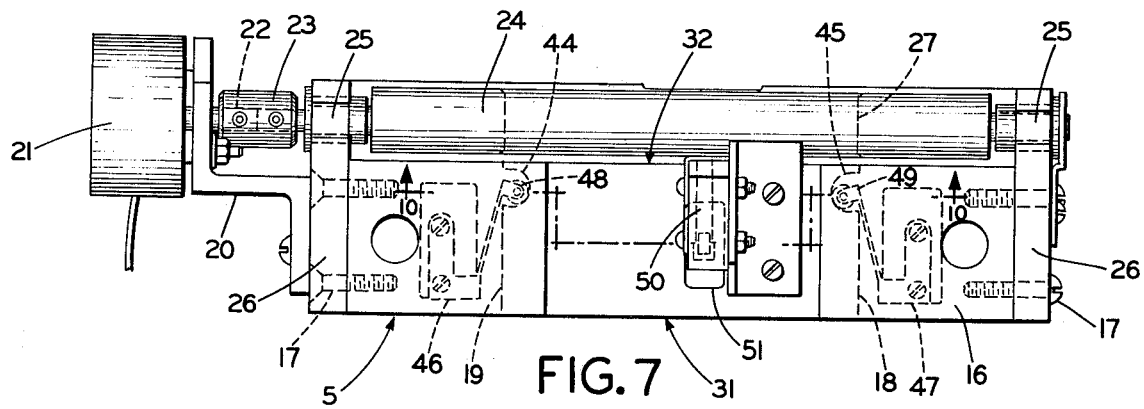
FIG. 7 is a plan view of the parts shown in FIG. 6.
Figure 6:
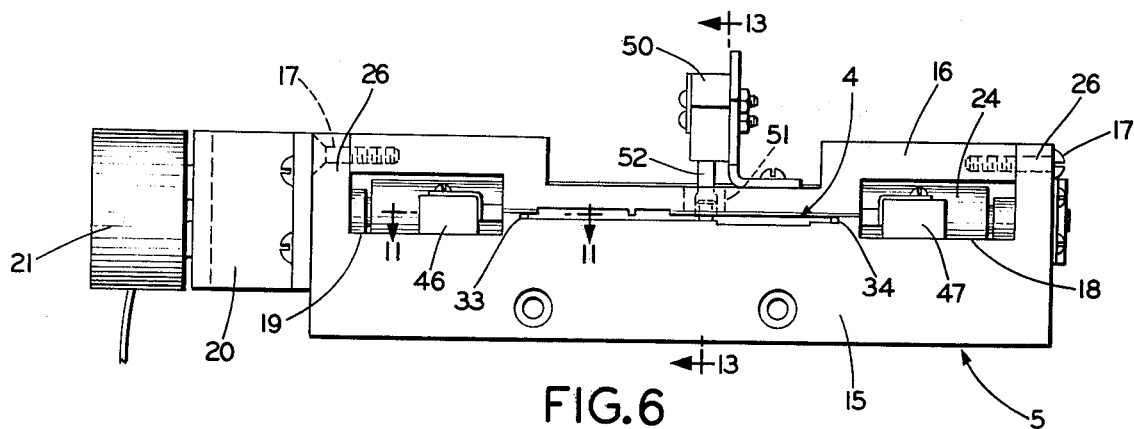
FIG. 6 is a front elevation of the improved entry gate removed from the remainder of assembled components shown in FIGS. 4 and 5.
Figure 9:
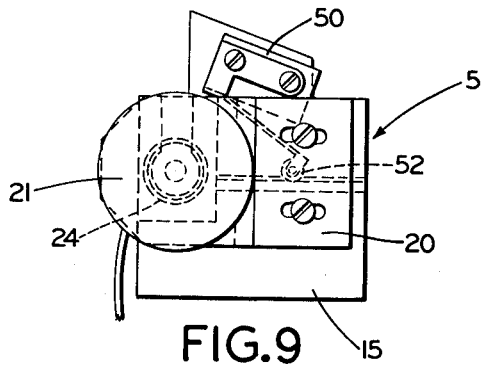
FIG. 9 is a side view looking toward the left-hand end of FIG. 6.
Figure 8:
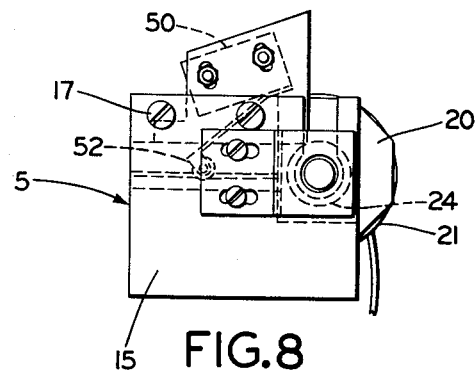
FIG. 8 is a side view looking toward the right-hand end of FIG. 6.

A typical automatic remote banking unit for dispensing currency in response to the presentation by a bank customer of a coded credit card is indicated at 1. The banking unit 1 fundamentally is energized after a customer inserts a coded card into a slot 2 in an entry funnel 3. The slot 2 communicates with the entry slot generally indicated at 4 in the improved entry gate unit generally indicated at 5. The card is verified as to genuineness in the entry gate unit 5 and if accepted, the entry gate unit 5 unblocks the entry slot 4 permitting the card to move to and to be engaged by conveyor mechanism in a card reader generally indicated at 6.

The coded card is verified in the card reader 6 to confirm that it is an authorized card and that the user thereof is an authorized user. After the card and customer verification operations have been carried out, keyboard entries may be made by the customer at the keyboard 7, and other procedures may be followed by the customer in accordance with instructions presented to the customer at instruction panel 8. Among entries that may be made by the customer in the manual keyboard 8 are those which indicate the amount of currency that the customer may desire to withdraw. Following proper keyboard entries, currency is discharged from a currency supply and delivered to a cash drawer, indicated generally at 9. The currency supply is held in a protective location within the housing of the banking unit 1.

The various components of the unit 1, except for the entry funnel 3, the entry gate unit 5, and the relationship of the unit 5 to the card reader 6, form no part of the present invention; which relates and is directed to the entry gate construction and its cooperative relation to the card reader 6.

However, the currency supply and conveyor delivery mechanism (not shown) in the unit 1 may comprise a standard unit such as shown in Whitehead, et al., U.S. Pat. No. 3,760,158 which delivers currency being dispensed to the cash drawer 9. The cash drawer 9 may be a rotary cash drawer mechanism such as illustrated, described and claimed in the copending application Ser. No. 445,236 of Herbert Morello, George S. Mountford and Richard E. Keck, filed Feb. 25, 1974, for Rotary Cash Drawer Mechanism for Currency Dispenser.

FIG. 1 shows the unit 1 removed from a wall 10, shown in dot-dash lines in FIG. 2, of a larger enclosure in which unit 1 may be installed. A recessed facia 11 may project from the heavy protective housing wall 12 of the unit 1. Facia 11 acts to shield somewhat the entry funnel 3, the keyboard 7, the instruction panel 8 and the cash drawer 9 from weather conditions, and also acts to reduce visibility by third persons of the manner in which the customer may be manipulating the keyboard 7.

Ordinarily, the various components 3, 7, 8 and 9 at the back zone of the recessed facia 11 are covered at night or when the unit 1 is out of operation by a protective vandal guard plate 13 which may be raised in the direction of the arrow 14 (FIG. 2) by bank personnel, or by a motor remotely actuated by bank personnel, when the equipment is to be rendered available for operation or use.

The improved entry gate unit 5 (FIGS. 4-9) includes a lower housing block 15, and an upper housing block 16 suitably assembled to the block 15 by screws 17. Surfaces of the lower block 15 and the upper block 16 are geometrically formed with the main entry slot 4 and cooperatively arranged with other components in a manner described below to control the insertion of a typical credit card used to actuate the banking unit 1.

Compartments 18 and 19 are formed by the housing blocks 15 and 16 adjacent the ends thereof. A bracket 20 is mounted on one end of the housing blocks 15-16 on which a rotary solenoid 21 is mounted.

The shaft 22 of solenoid 21 is coupled at 23 with a rotary tumbler gate 24 journaled at 25 in the angular end walls 26 of the housing block assembly 15-16. The tumbler gate 24 has a slot 27 which normally is in a position out of alignment with the main entry slot 4. Thus, the normal position of the tumbler gate 24 and its slot 27 is such that it blocks and thus normally is in "blocking" position with respect to the main entry slot 4.

When the tumbler gate slot 27 is moved to unblocking position by energizing the solenoid 21, the slot 2 in entry funnel 3, the main entry slot 4, and the tumbler gate slot 27 all are aligned with each other so as to direct a credit card inserted through the aligned slots to a feed roll 28 in card reader 6 which conveys a credit card for processing in the card reader 6 in a usual manner.

Figure 10:
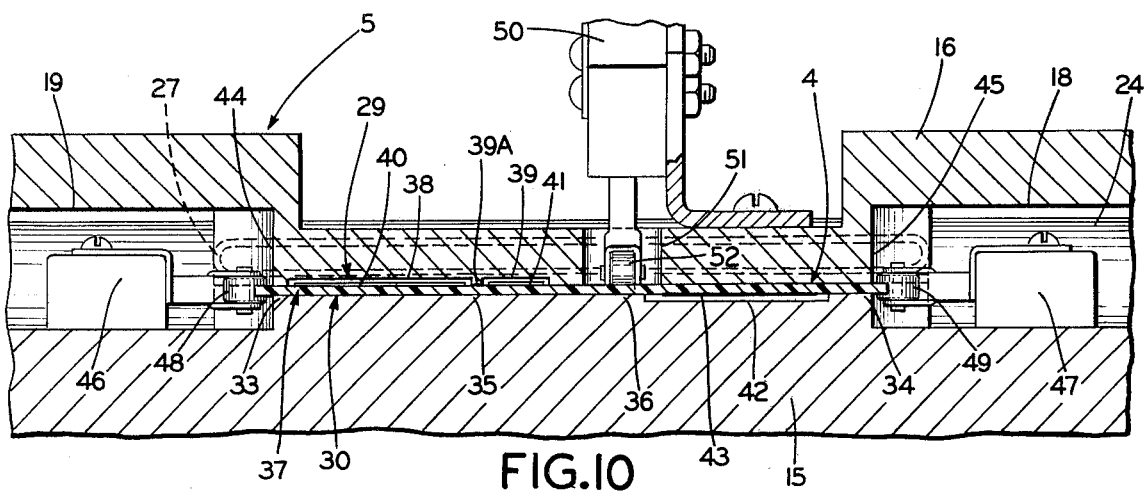
FIG. 10 is an enlarged fragmentary vertical sectional view of the entry gate, taken on the line 10—10, FIG. 7.

The geometry of the main entry slot 4 in cross section is best shown in FIG. 10. The upper housing block 16 has a surface generally indicated at 29 which forms the upper surface of main entry slot 4, and the lower housing block 15 has an opposing surface generally indicated at 30, which forms the lower surface of main entry slot 4.

These upper and lower slot surfaces 29 and 30 extend longitudinally of the housing members 15 and 16 between the open end 31 of slot 4 (FIG. 7) and the normally blocked end 32 of the slot 4.

The slot 4 at its restricted edges 33 and 34 and at intervening restricted slot zones 35 and 36 in the upper and lower surfaces 29 and 30 is spaced apart a distance equal substantially to the specified thickness of a genuine plastic credit card, illustrated generally at 37 in cross section in FIG. 10, wherein the plastic credit card 37 is shown extending into main entry slot 4.

The slot 4 also has a lateral width between its retricted edge portions 33 and 34 equal substantially to the specified width of a normal credit card or one which complies with ANSI requirements. Thus, the upper and lower slot surface portions at the slot edges 33 and 34 form restricted slot edge zones.

The upper slot surface 29 is recessed at two laterally separated intervals 38 and 39, divided by the separating portion 39A at the intervening slot zone 35, a greater distance than the thickness of the credit card to be entered plus the amount of projection of the embossments 40 and 41 projecting upward from the normal upper surface of the plastic card 37, so as to clear the projecting card embossment and avoid wear, damage or injury to the card as it moves through slot 4.

The lower slot surface 30 also is recessed at 42 adjacent the slot edge portion 34 and between that portion 34 and the intervening slot zone 36 to provide substantial clearance in the longitudinally extending slot passage. This clearance provided by the slot recess 42 is formed to avoid any contact of slot surfaces with the undersurface portion of the credit card 37 where a magnetic stripe is located, indicated by the heavy black line 43. Normally, ANSI credit cards that include a magnetic stripe have the stripe formed on the opposite side of the card from that containing embossment.

An opening 44 (FIG. 7) is formed in the housing blocks 15-16 extending between compartment 19 and the left-hand restricted slot edge portion 33, and a similar opening 45 is formed in housing blocks 15-16 communicating between compartment 18 and the right-hand restricted slot edge portion 34. These openings 44 and 45 are located intervening the open end 31 of slot 4 and the normally blocked end 32 thereof, preferably close to the normally blocked slot end 32, as shown in FIG. 7.

A microswitch 46 is mounted in the left housing compartment 19 (FIG. 7) and another microswitch 47 is mounted in the right housing compartment 18. The microswitches 46 and 47 are normally open and have switch blade actuator means 48 and 49 which project, respectively, through openings 44 and 45 slightly into the left and right restricted slot edge zones 33 and 34 of main entry slot 4. These microswitches 46 and 47 act as gauge means, described below, for gauging the width of a credit card 37 passing through entry slot 4.

Another microswitch 50 is mounted on the upper housing block 16 above the intervening slot zone 36 and an opening 51 is formed in the upper housing block 16, communicating with the restricted thickness intervening slot zone 36 having a slot thickness equal to the normal credit card thickness. Microswitch 50 is normally open and has a switch blade actuator 52 which projects through opening 51 into the restricted intervening slot zone 36. Microswitch 50 acts as a gauge, described below, for gauging the thickness of a credit card 37 moving through the main entry slot 4.

The normally open switches 46, 47 and 50 are connected in circuitry with a source of power and the rotary solenoid 21, so that when all three switches 46, 47 and 50 are closed, solenoid 21 is energized. Energizing solenoid 21 rotates rotary tumbler gate 24 to a position wherein tumbler slot 27 is aligned with main entry slot 4, thus unblocking the main entry slot.

Microswitches 46 and 47 are only closed when a genuine credit card 37 having the required width is passed through entry slot 4. In other words, if the credit card has greater than specified width, it cannot be inserted into entry slot 4. If the card has less than specified width, the switch blade actuators 48 or 49 projecting into entry slot 4 at opposite edges thereof, will fail to close one or the other or both of microswitches 46 and 47. In such event, solenoid 21 is not energized and does not move rotary tumbler gate 24 to a position unblocking the main entry slot 4.

Similarly, a spurious credit card thicker than required specifications cannot be moved into entry slot 4. If the card is too thin, then switch blade actuator 52 projecting into restricted slot zone 36 will not be moved sufficiently to close microswitch 50 and thus solenoid 21 will not move tumbler gate 24 to an unblocking position.

Figures 11, 12:
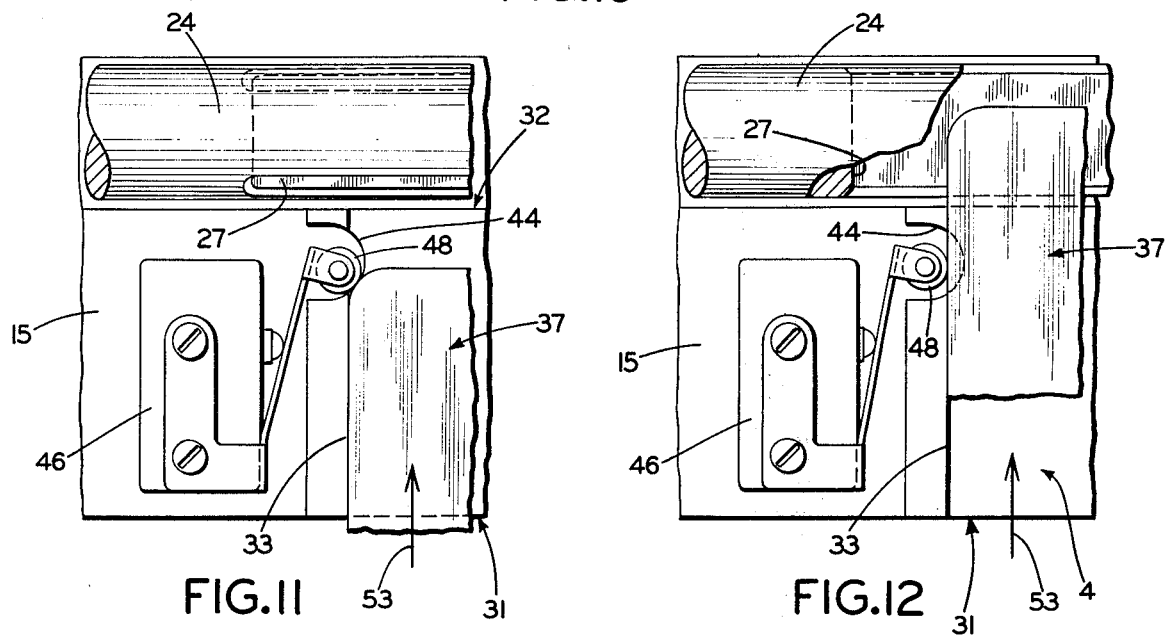
FIG. 11 is a fragmentary plan sectional view looking in the direction of the arrow 11—11, FIG. 6, illustrating a credit card partially inserted into the entry gate.
FIG. 12 is a view similar to FIG. 11 showing the credit card inserted further into the entry gate.

The operation of the switches 46, 47 and 50 is shown in FIGS. 11 through 14. In FIG. 11, switch 46 has its actuator 48 extending through opening 44 into main entry slot 4, and shows a credit card 37 being inserted in the direction of the arrow 53 and approaching switch blade actuator 48. A genuine card 37 of proper width is shown in FIG. 12 moved in the direction 53 past switch actuator 48 closing switch 46. The right-hand microswitch 47 is actuated in the same manner as is shown in FIGS. 11 and 12.

Figure 13:
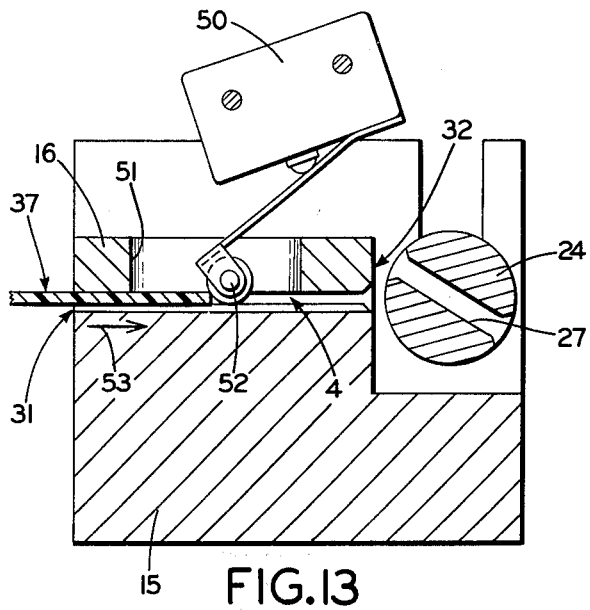
FIG. 13 is a fragmentary vertical sectional view looking in the direction of the arrows 13—13, FIG. 6, illustrating a credit card inserted into the entry gate to the same extent as in FIG. 11.
Figure 14:
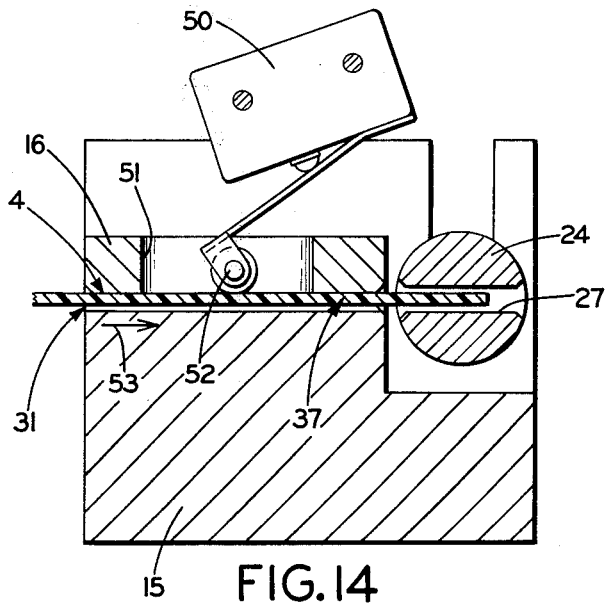
FIG. 14 is a view similar to FIG. 13, but showing the card inserted further as in FIG. 12.

Similarly, FIG. 13 illustrates a switch blade 52 moving into entry slot 4 but before the credit card 37 has engaged the actuator, and shows rotary tumbler gate 24 in blocking position. FIG. 14 shows switch blade 52 engaged by credit card 37 closing switch 50 and also illustrates tumbler gate 24 moved to unblocking position upon the closing of microswitches 46, 47 and 50.

Thus far, the manner of checking the genuineness of a credit card has been described, that is whether the card has the correct width and thickness. In addition to verifying the genuineness of the card, the improved entry gate construction prevents a card meeting ANSI specifications from being introduced into or entered into the main entry slot 4 except with the proper surface up and the proper card end first entered into the slot so that when the card 37 subsequently is delivered to the card reader 6, the card will be oriented in the proper manner.

FIG. 5 diagrammatically shows in dot-dash outline, a card that has just emerged from the entry gate unit 5 and is being conveyed in the usual manner through the card reader 6, with the embossed characters 40 and 41 on the card on the top side of the card as shown in FIG. 10, and with the magnetic stripe 43 on the bottom side of the card; and also with the embossment 40-41 on the left portion of the card viewing FIG. 10 and the magnetic stripe 43 on the right portion of the underside of the card.

The delivery of the card 37 to the card reader 6 is sensed by usual sensor means in the card reader which sensor means controls the circuitry for the tumbler gate solenoid 21 so that the tumbler is held open until the card arrival in the card reader, when the solenoid 21 is de-energized and the tumbler gate 24 returns to blocking position to prevent another card from being inserted in the entry gate unit 5 until the delivered card has been processed in the card reader and returned to the customer in the reverse direction through the entry gate unit 5. The return of a processed card by moving the card in the reverse direction from entry direction in the card reader 6 actuates sensor means in the card reader which energizes solenoid 21 to move tumbler gate 24 to an unblocking position, permitting the reversely moving card 37 to be returned to the customer through the entry gate unit 5 and slot 2 in the entry funnel 3.

The geometry of the main entry slot 4 is such that an embossed magnetic stripe card 37 only can be accepted one way; and this control is provided by a very simple construction not only to verify the genuineness of the card width and thickness but also to properly orient the card with embossment 40-41 and magnetic stripe 43 and presented at the proper surface and location in the card reader 6.

The restricted slot zone 35 below separation portion 39A in effect provides a ridge which may pass between two rows of embossments 40-41. This ridge 39A is very important in that it prevents a card from being entered up-side down or turned end to end and flexed slightly to be improperly entered. The ridge 39A not only prevents such flexing but as stated, it passes between the adjacent rows of embossment so as to hold the card in proper position edgewise.

As stated, the insertion of a card 37 in the entry gate unit 5 in the proper manner energizes the solenoid 21 and moves the tumbler gate 24 to an unblocking or open position thus permitting a customer having a genuine card to push the card into the entry gate without any noticeable restraint, to a position where it is engaged by driven rolls or other conveyor means in the card reader.

The described operation of the equipment has described a card as being returned after processing in the card reader. Such procedure, however, is modified in a usual manner in the event that the card reader determines that the card is a "hot" card. In this event normally the "hot" card is retained in the equipment.

Wiring Diagram

FIG. 15 is a schematic diagram for the circuitry involving the operation of the entry gate unit 5 and its switches 46, 47 and 50. The wiring is illustrated typically connected with the logic represented by the block 54 and a computer represented by a block 55 which may control operation of the entire automatic banking unit 1.

The card reader 6 has a motor 56, and the tumbler solenoid 21 also is indicated in the diagram. Two photodiodes 57 and 58 are associated with the card reader, indicated diagrammatically in FIG. 5.

The logic 54 decides when the motor 56 should run. Also, when the three normally open switches 46, 47 and 50 all are closed or activated, then the motor 56 is energized so that it will convey the card through the card reader sequence following its acceptance through the entry gate unit 5. When only the second photo detector or photodiode 58 has an output, the solenoid 21 is de-energized, and the tumbler gate 24 is closed, preventing another card from being entered into the card reader.

When the photo detector or photodiode 57 has an output, at the completion of the procedure inititated by the entry and acceptance of a valid card, the entry gate is opened to permit return of the card to the customer.

Accordingly, the new entry gate construction verifies the genuineness of a credit card presented as well as insures the proper orientation of the credit card for processing subsequently in the card reader. Further, this combined result is achieved with an uncomplicated geometry for the main entry slot and the related simple components of the entry gate construction.

The improved entry gate construction may be used with any of a number of types of currency dispensers or automatic banking equipment and will accept credit cards conforming to ANSI standards.

Finally, the improved construction achieves the objective stated, eliminates the difficulties heretofore existing in the art which have been described, and solves problems and obtains the new results indicated.

In the foregoing description, certain terms have been used for brevity, clearness and understanding; but no unnecessary limitations are to be implied beyond the requirements of the prior art because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the new entry gate is constructed and operated, and the advantageous, new and useful results obtained; the new and useful structures, devices, components, elements, arrangements, parts, combinations, systems, equipment, operations, relationships are set forth in the appended claims.

We claim:

1. Entry gate construction for embossed credit card actuated automatic remote banking equipment including gate housing means forming a longitudinally extending main entry slot open at one end and having the other end adapted normally to be blocked; tumbler gate means mounted on the housing means movable between positions blocking and opening said main slot; said main slot having upper and lower surface portions defining at spaced lateral intervals a thickness equal to a predetermined card thickness and having a width between slot edges equal to a predetermined card width; gauge means for gauging the width and thickness of a card being inserted into said slot; means operated by the gauge means for moving the tumbler gate means to open position upon insertion of a card having said predetermined width and thickness; and longitudinally extending recess and ridge means in said slot upper and lower surfaces preventing passage of an embossed card through the main slot except when presented with a predetermined card surface up and a predetermined card end initially entered into the main slot.

2. Entry gate construction as defined in claim 1 including entry funnel means mounted on the gate housing means, and a funnel slot generally rectangular in cross section formed in and extending through the entry funnel means and aligned with the main entry slot.

3. Entry gate construction as defined in claim 2 in which the tumbler gate means is formed with slot means aligned with said main slot when the tumbler gate means is in open position.

4. Entry gate construction as defined in claim 1 in which the main entry slot is a generally horizontally extending slot; in which the tumbler gate means is formed with a radial slot aligned with said main slot when the tumbler gate means is in open position, and in which the means for moving the tumbler gate means to open position is a rotary solenoid.

5. Entry gate construction as defined in claim 1 in which the upper and lower main slot surface card thickness defining spaced portions include restricted slot edge zones and a plurality of spaced intervening zones extending longitudinally of the main slot.

6. Entry gate construction as defined in claim 5 in which the gauge means for gauging the width and thickness of a card being inserted into the main slot comprise microswitches having switch blade actuators extending into the spaced restricted slot edge zones and into one of the intervening restricted zones, and engaged and actuated by a card being inserted in the main slot.

7. Entry gate construction as defined in claim 6 in which said switch means are normally open, and in which all of said switch means must be closed in order to energize the means for moving the tumbler gate means to open position.

8. Entry gate construction as defined in claim 5 in which one of the upper and lower main slot surfaces is recessed at either side of one of the intervening restricted slot zones to provide clearance for embossments projecting from a surface of an embossed card being passed through the main slot, and said recessed surfaces providing said longitudinally extending recess and ridge means in the main slot, whereby said ridge means extends between adjacent card embossments and prevents card flexing of a card being inserted into said slot.

9. Entry gate construction as defined in claim 8 in which the other of the upper and lower main slot surfaces is recessed adjacent one of the restricted edge zones to provide clearance for a magnetic stripe on a card being inserted into the slot.

* * * * *